W. F. BECKER.
ADVERTISING DEVICE.
APPLICATION FILED DEC. 15, 1911.
1,144,096.
Patented June 22, 1915.
2 SHEETS—SHEET 1.
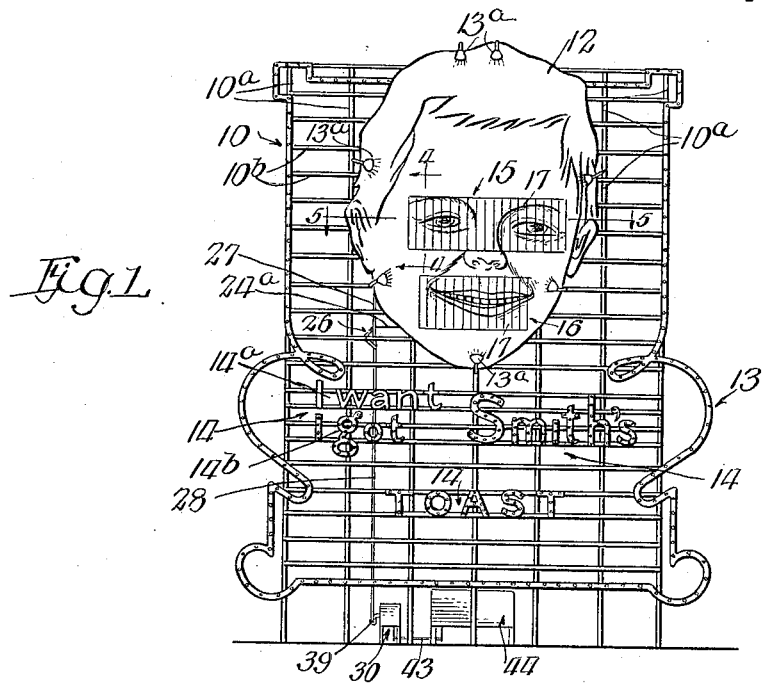
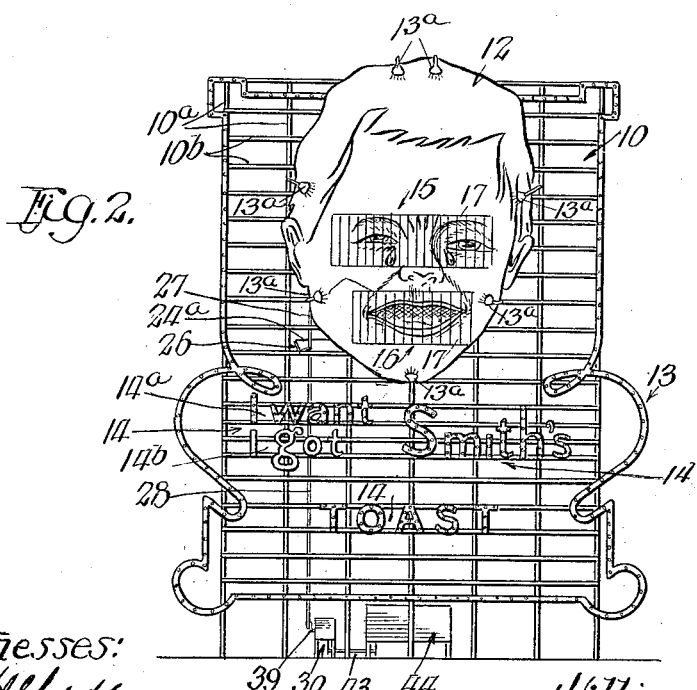

W. F. BECKER.
ADVERTISING DEVICE.
APPLICATION FILED DEC. 15, 1911.
1,144,096.
Patented June 22, 1915.
2 SHEETS—SHEET 2.
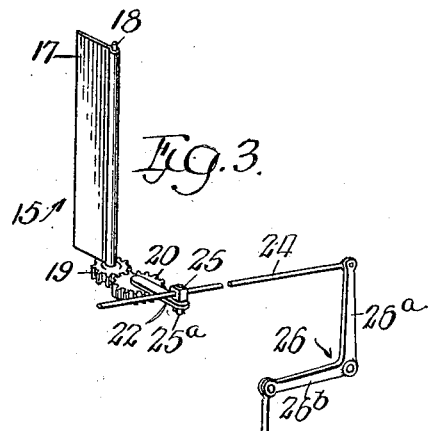
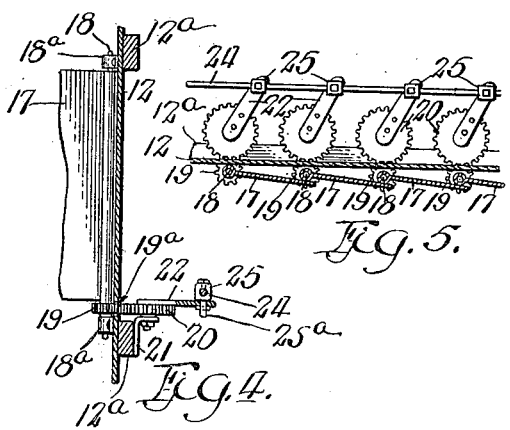
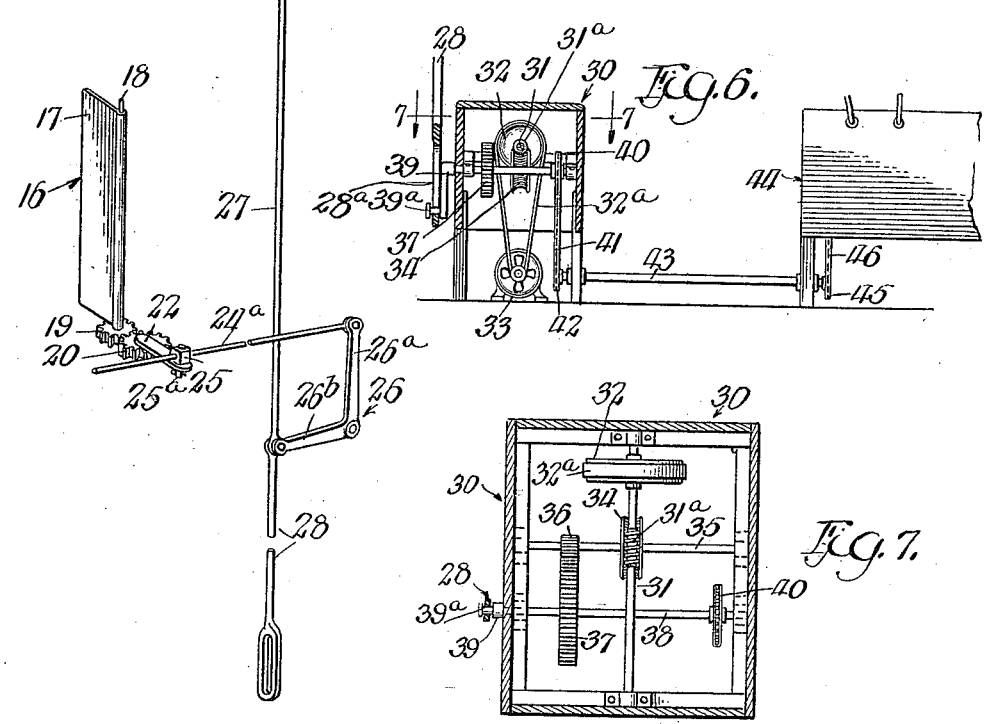
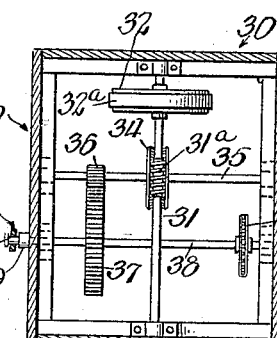
Witnesses:
Inventor:
William F. Becker.
by Poole & Brown Attys

UNITED STATES PATENT OFFICE.

WILLIAM FREDERICK BECKER, OF CHICAGO, ILLINOIS, ASSIGNOR TO THOMAS CUSACK COMPANY, A CORPORATION OF NEW JERSEY.

ADVERTISING DEVICE.

1,144,096.          Specification of Letters Patent.      Patented June 22, 1915.

Application filed December 15, 1911. Serial No. 666,078.

*To all whom it may concern:*

Be it known that I, WILLIAM FREDERICK BECKER, a citizen of the United States, and a resident of Chicago, in the county of Cook and State of Illinois, have invented certain new and useful Improvements in Advertising Devices; and I do hereby declare that the following is a full, clear, and exact description thereof, reference being had to the accompanying drawings, and to the letters of reference marked thereon, which form a part of this specification.

This invention relates to an improvement in advertising devices and consists of the matters hereinafter described and more particularly pointed out in the appended claims.

The invention, as shown herein, is applied to an electrically illuminated sign, which includes a pictorial representation, in this case, a picture of a child or baby's face, and certain words or phrases delineated by electric lamps, the lamp circuits being arranged and adapted for operation by a familiar form of switch mechanism, by means of which alternative sets of words or phrases are made to appear at periodic intervals. By constructing the placard bearing the pictorial representation, in accordance with my invention, the appearance or expression of the picture is made to change periodically, to correspond with the change in the alternative words or phrases above referred to. The placard or board on which the pictorial representation is shown, includes a plurality of parallel, reversible shutters forming the part of the placard on which appears the portion of the picture of which the appearance or expression is intended to be changed. One expression or appearance is shown on one side of said shutters, while a different expression or appearance is shown on the other, and the invention includes suitable mechanism for periodically shifting or swinging said shutters in unison to bring one or the other of their sides into the plane of the picture in suitable timed relation to the change from one alternative word or phrase to the other.

In the drawings:—Figure 1 is a front elevation of my improved advertising device or sign showing the representation of the face of a child having one expression, in this case, an expression of joy. Fig. 2 is a like view of my improved sign, showing a representation of the same face with a different expression, in this case, an expression of grief. Fig. 3 is a detail perspective view of the mechanism for operating the shutters on which are pictured the facial features, the appearance of which is intended to be changed periodically. Fig. 4 is a partial vertical section, on an enlarged scale, through the placard and shutters, bearing the pictorial representation, the shutter being shown in an intermediate position. Fig. 5 is a partial transverse section on a like scale through said placard and shutters. Fig. 6 is a view representing in vertical section the gearing for actuating the shutter operating mechanism and also in elevation the box containing the switch for controlling the electric lamp circuits. Fig. 7 is a cross-section through said gearing in a plane indicated by the line 7—7 of Fig. 6.

Referring now to that embodiment of my invention illustrated in the drawings, 10 indicates the sign, as a whole, the same being of any convenient construction and comprising a series of spaced vertical and transverse members 10$^a$, 10$^b$. On this frame work is supported a placard or board 12 which, as shown in the drawings, has painted or otherwise delineated upon it, the head of a baby or small child, and which is preferably cut out to the outline of said head.

13 indicates a series of lamps arranged to form a fanciful outline about the sign as a whole.

13$^a$, 13$^a$ indicate lamps which are arranged about the edge or border of the board 12 bearing the pictured face and which are provided with reflectors adapted to throw the light upon the board so as to brightly illuminate the picture as a whole.

14, 14 indicate a plurality of lamps arranged to form words or phrases, the letters comprising said words being outlined by said lamps in a familiar manner. Part of this wording consists of alternative words or phrases, one of which is intended to appear with one facial expression of the child shown on the placard and the other of which is intended to appear with the other facial expression thereof. As shown in the drawings, the lamp-outlined words are made to read either " I want Smith's toast " or " I got Smith's toast," depending upon which of the phrases "I want" or "I got" are brought out by the electric lighting. The electric circuits leading to the various lamps are controlled by an automatic switch of familiar construction by means of which the two sets of words are made to appear in alternation, the lamps 14$^a$ forming the words "I want" and the lamps 14$^b$ forming the words "I got," appearing and disappearing in alternation at periodic intervals.

The main part of the pictured representation or face 12 is immobile and is intended to appear the same in both instances. That part or parts of the placard on which appears the part of the face, or other pictorial representation which is most susceptible of indicating change of expression or appearance is composed of a plurality of hinged shutters. Said shutters are adapted to swing through substantially an angle of 180° so as to bring either side of the shutters into the plane of the picture and are arranged with the axes on which they swing spaced apart distances not greater than the width of the shutters themselves. With the shutters in one position, the picture is painted or otherwise portrayed on the placard 12 and on the exposed face of the shutters, with one expression or appearance. With said shutters in a reversed position, the part of the picture to appear in the space covered by the shutters is portrayed with another expression or appearance. Care should be taken that the shutters completely cover the space in which appears the part of the picture the expression or appearance of which is to be periodically changed.

Referring now in detail to the construction as shown herein, the placard 12 is in this case provided with two sets of shutters,—a set 15 which entirely covers the eyes and the mobile part of the nose and a set 16 which covers the part of the mouth and lips most subject to change of expression.

17 indicates the shutters in each instance. Said shutters, as shown herein, comprise narrow vertically extending panels or strips, each of which is secured at one edge to a vertical rod 18 (see Fig. 4), which is rotatively mounted in bearings 18$^a$ 18$^a$, secured to the front face of the placard or board 12. The rod 18 is adapted to freely swing in its bearings. The rods 18 of the several shutters are preferably spaced apart a distance slightly less than the width of the shutters so that when said shutters are swung on the axial rods 18 into the plane of the placard 12, their edges remote from their axes 18 will overlap the edges of the next adjacent shutters, as shown in Fig. 5. To each of the rods 18 is rigidly secured a pinion 19 which meshes with a gear 20 located back of the placard and rotatively mounted on an angle bar 21 secured to a cross-bar 12$^a$ which may be one of a series of such bars used to strengthen the placard when made of thin sheet metal as shown in this case. The pinion 19 projects through an aperture 19$^a$ in the placard 12.

22 indicates an arm rigidly secured to the gear 29. There is thus an operating arm for each of the shutters 17 and the several arms of the two sets of shutters 15, 16, have pivotal connection with horizontally extending, parallel, reciprocatory rods 24, 24$^a$ located back of the placard 12. As shown herein, said pivotal connection is made by means of blocks 25, having apertures through which said rods 24, 24$^a$ extend, and carrying set-screws which rigidly secure the blocks to the associated rod. Each block has a stud 25$^a$ by means of which it is pivotally connected to an associated arm 22. It is apparent that by means of this construction, the horizontal reciprocation of the rods 24, 24$^a$, will cause the shutters to swing on their axial rods 18. In order to provide for the full swing of the shutters through an angle of 180° while, at the same time, reciprocating the rod 24 through a comparatively short distance, the gears 20 are made of larger diameter than the pinions 19.

Each of the rods 24, 24$^a$ is pivotally connected to the upright arm 26$^a$ of an associated bell crank lever 26, said bell crank levers being rotatively supported in any convenient manner by the frame of the sign. The horizontal arms 26$^b$ of said bell crank levers are connected to each other by a link 27 and both levers are operated by a depending link 28 which has pivotal connection with the horizontal arm 26$^b$ of the lower bell crank lever. Vertical reciprocatory movement is imparted to the link 28 by means of the following mechanism: 31 indicates a horizontal shaft rotatively mounted in an inclosing box 30 located, as shown, near the base of the sign. On said shaft 31 is keyed a pulley 32 which is connected by a belt 32$^a$ to a motor 33 below said shaft. A worm 31$^a$, formed on the shaft, meshes with a worm-gear 34 keyed to a second shaft 35 located below and extending at right angles to the shaft 31. A pinion 36 keyed to the second shaft 35, meshes with a gear 37 keyed to a third shaft 38 extending parallel to the second shaft 35. The shafts 35 and 38 have rotative bearing in the box 30. One end of the third shaft 38 projects without the box 30 and has there connected to it a crank arm 39. The vertically reciprocating link 28, which acts to oscillate the bell crank levers 26, is provided at its lower end with an elongated slot 28$^a$ in which a crank pin 39$^a$ on the crank arm 39 engages. It is apparent from this construction that the motor will impart rotative movement to the shaft 31, which in turn through the worm 31$^a$ and the worm gear 34, the shaft 35, the pinion 36 and the gear 37 will impart rotative movement to the crank arm 39. The vertical component of the rotative movement of the crank pin 39ª will be communicated to the link 28 which will thus cause the bell crank levers 26 to oscillate on their axes. By reason of the slot 28ª in the link 28 there will be a certain lost motion between the crank pin and said link, so that while the crank pin will rotate continuously the up and down movement imparted to the link 28 will occur at periodic intervals. Thus, by this operation the shutters are rotated into one position and are allowed to stand in that position for a certain space of time whereupon they are swung into their opposite position and are allowed to stand in that position for a predetermined length of time before they are again shifted.

On the shaft 38 is mounted a sprocket wheel 40 which is connected by a sprocket chain 41 to a second sprocket 42 on a shaft 43. Said shaft 43 extends to a box 44 containing a lamp circuit controlling switching device, and has there keyed to it another sprocket wheel 45 which, by means of a sprocket chain 46 drives the operating shaft of said switching device in proper timed relation to the shifting movement of the shutters 17. This switch device is of familiar construction and, as it forms no part of the present invention, needs no description herein. In the case illustrated, the switching device controls the successive lighting and extinction in alternation of the lamps which form the words "I want" and "I got" respectively. As shown in Figs. 1 and 2 the switch is so timed and arranged that the words "I want" will be caused to appear when the shutters are turned to bring to the front the sides of the shutters bearing the representation of the crying expression of the mouth and eyes (Fig. 2) while the words "I got" will be caused to appear and the words "I want" to disappear when the shutters are turned to bring to the front their sides bearing the representation of the smiling expression of the eyes and mouth. (Fig. 1).

Manifestly, any representation may be depicted on the placard upon which may appear pictures of animate or inanimate objects of all kinds, either in whole or in part, designs, symbols, letters, emblems or anything else capable of pictorial representation. As shown herein, only a part of the picture is changed by the shifting or reversing of the shutters, but it is evident that the entire representation may be caused to change.

While in describing one embodiment of my invention I have referred to certain details of mechanical construction and arrangement, these may evidently be altered or changed in various ways without departing from the spirit of my invention and I do not wish my invention to be limited in any way except as pointed out in the appended claims.

I claim as my invention—

1. An advertising device comprising a placard on which a representation is depicted, said placard including a plurality of shutters having opposite sides each adapted to form a part of the exposed surface of said placard, the opposite sides of said shutters bearing alternative representations of the parts of the depicted matter adapted to appear in the spaces covered by said shutters, rock-shafts made rigid with said shutters, pinions fixed to said rock-shafts, gears meshing with said pinions, arms rigid with said gears, a longitudinal reciprocating rod having pivotal connection with each of said arms, and means capable of lost motion for reciprocating said rod.

2. An advertising device comprising a placard on which a representation is depicted, said placard including a plurality of shutters having opposite sides each adapted to form a part of the exposed surface of said placard, the opposite sides of said shutters bearing alternative representations of the parts of the depicted matter adapted to appear in the spaces covered by said shutters, rock shafts made rigid with said shutters, a longitudinal reciprocating rod, mechanism intermediate said reciprocating rod and said rock shafts for imparting rocking movement to said shafts in unison, a reciprocating link, means intermediate said reciprocating link and said reciprocating rod for imparting the movement of one to the other, a crank-arm provided with a crank-pin, said reciprocating link being provided with a slot in which said crank-pin engages, and means for continuously rotating said crank arm.

In testimony, that I, claim the foregoing as my invention I affix my signature in the presence of two witnesses, this 4th day of November, A. D. 1911.

WILLIAM FREDERICK BECKER.

Witnesses:
GEORGE R. WILKINS,
T. H. ALFREDS.

Copies of this patent may be obtained for five cents each, by addressing the "Commissioner of Patents, Washington, D. C."